Patented Oct. 16, 1934

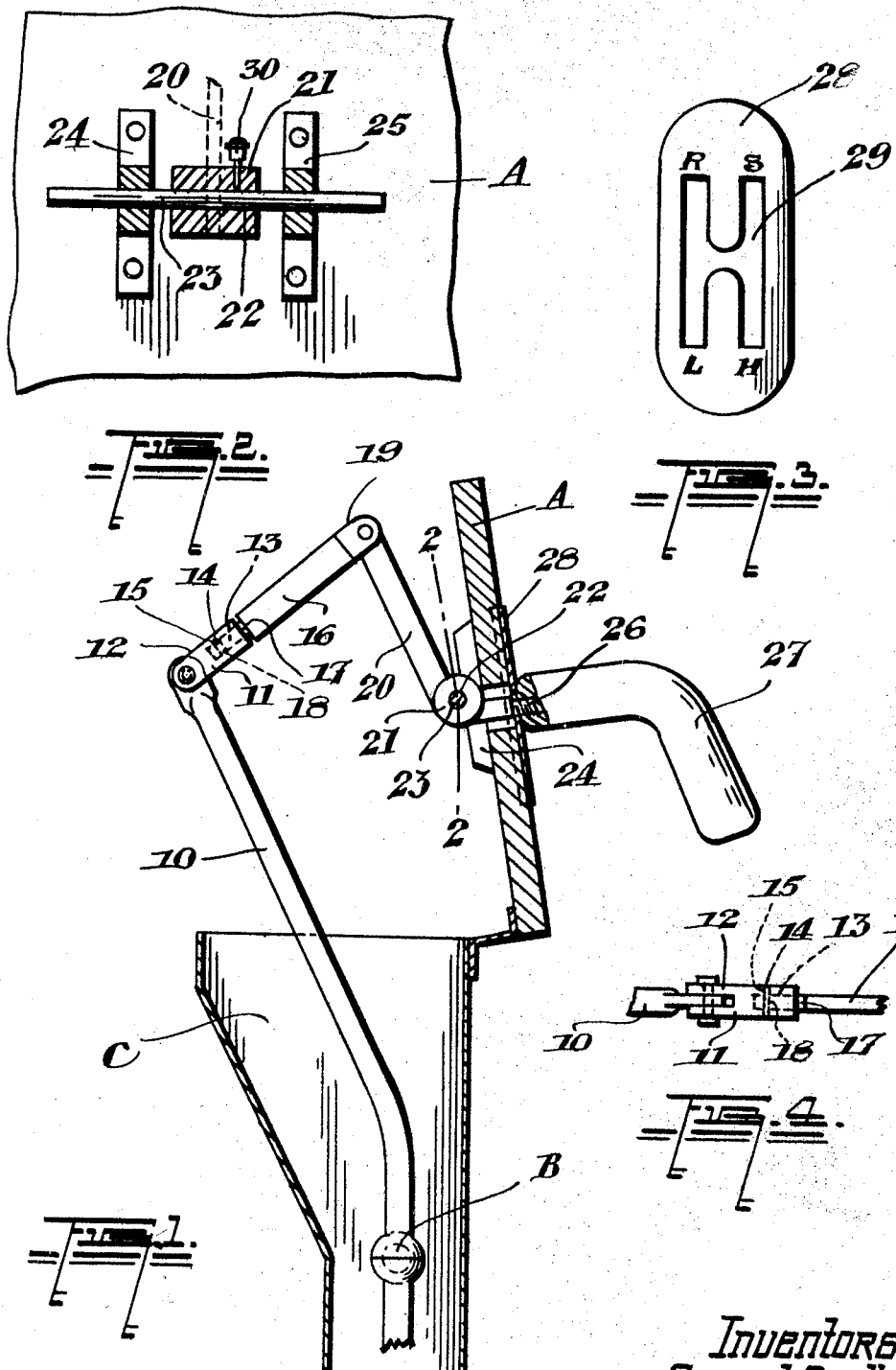

1,977,510

UNITED STATES PATENT OFFICE 1,977,510

DASHBOARD GEAR SHIFT ARRANGEMENT

Albert Gauthier and Eudgere Lalonde, Penetanguishene, Ontario, Canada

Application August 4, 1933, Serial No. 683,384

2 Claims. (Cl. 74—473)

This invention relates to improvements in a dashboard gear shift arrangement and an object of the invention is to provide a simplified form of structure of this type which will function smoothly and efficiently from the dashboard of an automobile.

A further object is to provide a structure of this type which can be easily installed on any make of automobile.

A further object is to provide a structure of this type which can be manufactured cheaply and which will minimize the obstruction caused by the usual form of gear shift lever.

With these and other objects in view the invention consists of an arrangement of levers connected to a gear shift lever projecting upwardly and forwardly with respect to the front of an automobile, with part of the assembly of levers fulcrumed slidably on a transverse pin mounted at the rear of the dashboard and directed through the dashboard where an operating handle is free to move upon manual operation through channels formed in H-shaped arrangement upon a plate mounted on the front of the dashboard, as more fully described in the following specification and illustrated in the accompanying drawing which forms part of the same.

In the drawing:—

Figure 1 shows the gear shaft arrangement in elevation with the dashboard panel and part of the operating handle shown in section.

Figure 2 is a plan of the rear of the dashboard taken on the line 2—2 of Figure 1, showing the transverse spindle and securing bracket and a fragmentary section of one of the operating levers pivotally mounted on the spindle.

Figure 3 is a plan view of the plate which is mounted on the front of the dashboard and provided with an H-shaped guideway through which the operating handle will pass.

Figure 4 is a plan view of a swivelling knuckle joint connected to the gear lever.

In the drawing like characters of reference indicate corresponding parts of different views. A indicates the instrument board of an automobile and B indicates the usual universal joint to which a gear shift lever 10 is attached. C is a casing which encloses the lower part of the lever 10 and is connected to the dashboard by suitable brackets. This gear shift lever projects upwardly and forwardly with respect to the front of an automobile and is connected at its upper end to a knuckle joint 11, more fully illustrated in Figure 4. This knuckle joint is bifurcated at 12 and socketed at 13 and is provided with a key 14 fitted into an orifice 15. This keyway orifice is drilled perpendicularly to the socket 13, and is slightly offset with respect to the longitudinal axis of the knuckle joint 11. A member 16 is machined at one end 17 to make a sliding fit into the socket 13 and this machined end is provided with a semi-circular groove 18 near its end. The keyway orifice is offset to an extent that will permit a key to be drifted into said orifice to rest against the shoulders of the groove 18, thus preventing the machined portion 17 of the member 16 from pulling out of the socket 13 while permitting 17 to turn in said socket. The opposite end of the member 16 is bifurcated at 19 and is attached by means of a rivet to a lever 20. The opposite end of the lever 20 to that which is attached to the bifurcated end 19 of the lever 16 is shaped to form a bushing 21 which is provided with an orifice 22 and for the reception of a spindle 23 which is mounted on brackets 24 and 25 mounted upon the rear of the dashboard A. A lever 26 forming the core of an operating handle 27 passes through the dashboard A and is connected at one end to the bushing 21.

From the foregoing it will be seen that the transverse spindle 23 forms the fulcrum of the lever assembly 20 and 26 which assembly is free to slide on the spindle 23 as far as will be permitted by the brackets 24 and 25 and is also swingable upon the spindle 23.

A plate 28 is mounted on the front of the dashboard and is provided with an H-shaped channel 29 through which the lever 26 also passes. The extremities of the H-shaped channel form the low, reverse, second and high positions for the gear mechanism, and the cross bar of the H forms the neutral position.

Assuming the lever assembly 20 and 26 to be moved into the low position of the H-shaped channel, it will be clearly seen that the gear lever 10 will be pulled towards the rear of the automobile and thus occupy the normal position in a standard gear shift. Upon moving the operating handle 27 to the neutral position and sliding it across to the position occupied by the second speed, it will be seen that the gear lever 10 follows the same path as though the gear lever itself were manually operated. In operating the handle 27 along the spindle while in the neutral position, the advantage of the swivelling feature of the knuckle joint will be observed since there is a slight turning motion of the machined portion 17 in the socket 13 while this sliding motion is in progress. If it were not for this swivelling feature there would be an undesirable degree of torsion which would impair the efficiency of the gear shifting operation. It will be clearly seen that when the operating handle is shifted into any of the positions indicated on the plate 28, that the gear lever will follow exactly the same course as though the gear lever itself had been operated in the ordinary manner. A gland 30 is provided on the bushing 21 to insure smooth motion of the lever assembly on the spindle 23.

From the foregoing it will be seen that we have provided a dashboard gear shifting arrangement which is easily operated and will materially increase the amount of leg room in the front seats of an automobile and one which can be easily and economically installed upon any make of automobile.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What we claim is:—

1. In a dashboard gear shift arrangement, the combination with a gear shift lever, of a dashboard carried pintle, a bell crank lever fulcrumed on said pintle and movable axially thereon, an operating handle on one arm of the bell crank lever, and a link operatively connecting the other arm of the bell crank lever and the gear shift lever.

2. In a dashboard gear shift arrangement, the combination with a gear shift lever, of an operating handle mounted on the dashboard for shifting thereon in the prescribed manner of gear shift manipulation, and a link operatively connecting said gear shift lever and the operating handle, said link comprising sections connected in swivelled relation.

ALBERT GAUTHIER.
EUDGERE LALONDE.